Jan. 8, 1963 J. R. BUFFINGTON ETAL 3,072,853
GATE CIRCUIT
Filed Jan. 26, 1960
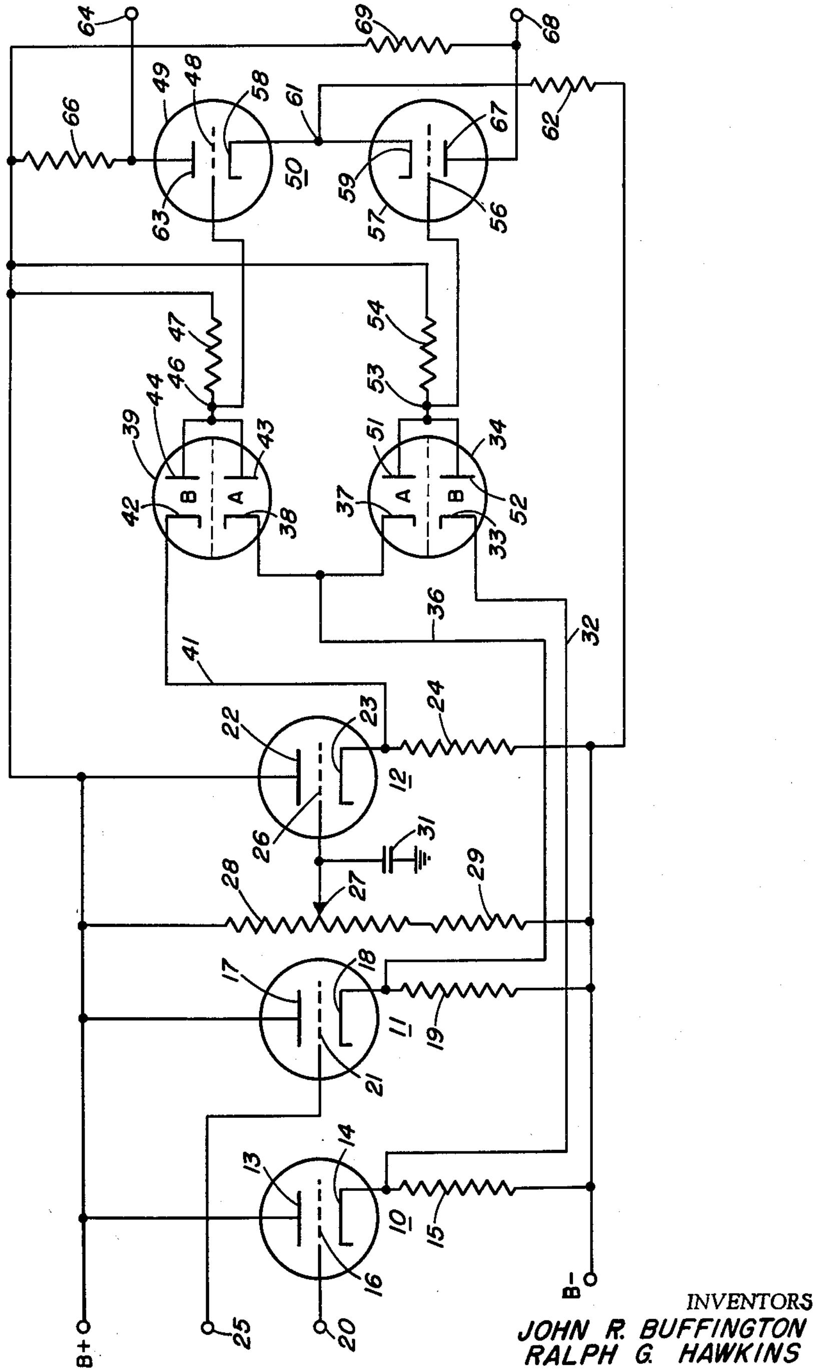
INVENTORS
JOHN R. BUFFINGTON
RALPH G. HAWKINS
BY R. J. Tompkins
ATTORNEY United States Patent Office 3,072,853 Patented Jan. 8, 1963

3,072,853
GATE CIRCUIT

John R. Buffington, Milford, N.H., and Ralph G. Hawkins, Poughkeepsie, N.Y., assignors, by mesne assignments, to the United States of America as represented by the Secretary of the Navy Filed Jan. 26, 1960, Ser. No. 4,839
4 Claims. (Cl. 328—99)

The present invention relates to a gate circuit and more particularly to a gate circuit in which either positive or negative signals may be applied and gated without the gate appearing in the output circuit.

In certain circuits, as for example, servo systems, it is desirable that information in the form of a gated signal be provided without the gate appearing in the output circuit. In the present invention a reference voltage is established which is equal to the non-operating voltage of a signal source. Dual duplex-diodes are connected to the reference source, signal source and a gate such that the diodes will provide equal outputs in the absence of an input signal. If a signal is present, the outputs of the diodes will be different depending upon the polarity and amplitude of the signal applied. The outputs from the diodes are coupled to a differential amplifier, the output of which is proportional to the gated signal.

Accordingly, an object of the present invention is to provide a gate circuit in which either positive or negative signals may be applied and gated without the gate appearing in the output circuit.

Other objects and many of the attendant advantages of this invention will be readily appreciated as the same becomes better understood by reference to the following detailed description when considered in connection with the accompanying drawings wherein there is shown three cathode followers 10, 11 and 12. Cathode follower 10 has an anode 13 connected to B+ supply, a cathode 14 connected to a B— supply through resistor 15, and a grid 16 to which an input signal is applied at terminal 20. Cathode follower 11 has an anode 17 connected to B+ supply, a cathode 18 connected through resistor 19 to the B— supply and a grid 21 to which a gating signal is applied at terminal 25. Cathode follower 12 has an anode 22 connected to the B+ supply, a cathode 23 connected to the B— supply through resistor 24 and a grid 26 connected to the movable arm 27 of a potentiometer 28. Potentiometer 28 is connected between B+ and B— in series with dropping resistor 29. Bypass capacitor 31 is connected between grid 26 and ground. Cathode 14 of cathode follower 10 is connected through lead 32 to cathode 33 of duplex-diode 34. Cathode 18 of cathode follower 11 is connected through lead 36 to cathode 37 of duplex-diode 34 and cathode 38 of duplex-diode 39. Cathode 23 of cathode follower 12 is connected through lead 41 to cathode 42 of duplex-diode 39. Anodes 43 and 44 of tube 39 are connected to a common junction 46. Junction 46 is connected to B+ through anode resistor 47 and to the grid 48 of triode 49 of a differential amplifier 50. Anodes 51 and 52 of tube 34 are connected to a common junction 53. Junction 53 is connected to B+ through anode resistor 54 and to grid 56 of triode 57 of differential amplifier 50. Cathodes 58 and 59 of tubes 49 and 57 are connected to a common junction 61 which is connected through cathode resistor 62 to B—. Anode 63 of tube 49 is connected to output terminal 64 and through anode resistor 66 to B+.

In operation, cathode follower 12 is adjusted so that the direct current voltage out of this circuit is equal to the non-operating (no signal applied) voltage on the output of cathode follower 10. With no gate applied, current is flowing in the A portion of tubes 34 and 39. When a positive going gate is applied from the cathode follower 11 to cathodes 37 and 38; current flow reduces in the A portion of tubes 34 and 39 causing the voltage at junctions 46 and 53 to rise sufficiently to cause the B portion of tubes 34 and 39 to conduct. If there is no signal applied at terminal 20, then the voltage developed in the outputs of tubes 34 and 39 can be no higher than that adjusted on grid 26 and normally present on grid 16. Tubes 49 and 57 are thus in balance and there is no output signal. If a negative signal is applied to terminal 20 (either positive or negative signal may be applied) cathode 33 will be more positive than cathode 42 causing the voltage at junction 53 to be more positive than the voltage at junction 46. This voltage is applied to grid 56 of tube 57 which creates an unbalance in the differential amplifier 50. This unbalance appears across the output terminals 64 and 68 devoid of all other control gating or input signals.

Obviously many modifications and variations of the present invention are possible in the light of the above teachings. It is therefore to be understood that within the scope of the appended claims the invention may be practiced otherwise than as specifically described.

What is claimed is:

1. A gating circuit comprising first and second similar electron tube units, a plurality of inputs connected to said electron tube units, each of said units having two anodes directly connected together and two cathodes, one cathode of each unit being connected directly together, means coupling a gating signal to said directly connected cathodes through a first input, means coupling a reference voltage to one of the remaining cathodes through a second input, means coupling a signal voltage to the other of the remaining cathodes through a third input, and differential amplifier means coupled to said electron units to provide a gated output proportional to the magnitude and polarity of the signal voltage.

2. A gating circuit comprising first and second similar electron tube units, a plurality of inputs connected to said electron tube units, each of said units having two anodes directly connected together and two cathodes, one cathode of each unit being connected directly together, first cathode follower circuit means for coupling a gating signal to said directly connected cathodes through a first input, second cathode follower circuit means coupling a reference voltage to one of the remaining cathodes through a second input, third cathode follower circuit means for coupling a signal voltage to the other of the remaining cathodes through a third input, and differential amplifier means coupled to said electron units to provide a gated output voltage proportional to the magnitude and polarity of the signal voltage.

3. A gating circuit comprising first and second duplex-diodes, each of said diodes having its anodes directly connected together, one cathode of each diode being connected directly together, first cathode follower circuit means for coupling a gating signal to said directly connected cathodes through a first input, second cathode follower circuit means coupling a reference voltage to one of the remaining cathodes through a second input, third cathode follower circuit means for coupling a signal voltage to the other of the remaining cathodes through a third input, and differential amplifier means coupled across said directly connected diodes to provide a gated output voltage proportional to the magnitude and polarity of the signal voltage.

4. A gating circuit comprising first and second similar electron tube units, each of said units having two anodes directly connected together and two cathodes, one cathode of each unit being connected directly together, a first cathode follower having input circuit means for applying a gating signal thereto and an output, a second cathode follower having input circuit means for applying a reference voltage thereto and an output, a third cathode follower having input circuit means for applying an input signal thereto and an output, circuit means coupling the output of said first cathode follower to said directly connected cathodes, circuit means coupling the output of said second cathode follower to one of the remaining cathodes, circuit means coupling the output of said third cathode follower to the other of the remaining cathodes, and circuit means coupling the directly connected anodes of one of said electron units to a first input to a differential amplifier, circuit means coupling the directly connected anodes of the other of said electron units to a second input of said differential amplifier, said differential amplifier providing a gated output signal proportional to the amplitude and polarity of said input signal.

References Cited in the file of this patent

UNITED STATES PATENTS

| | | |
|---|---|---|
| 2,324,314 | Michel | July 13, 1943 |
| 2,715,997 | Hill | Aug. 23, 1955 |
| 2,725,467 | Atwood | Nov. 29, 1955 |
| 2,783,453 | Rose | Feb. 26, 1957 |
| 2,921,190 | Fowler | Jan. 12, 1960 |